(12) United States Patent
Roberts et al.

(10) Patent No.: US 10,602,056 B2
(45) Date of Patent: Mar. 24, 2020

(54) OPTIMAL SCANNING TRAJECTORIES FOR 3D SCENES

(71) Applicant: Microsoft Technology Licensing, LLC, Redmond, WA (US)

(72) Inventors: Mike Roberts, Atherton, CA (US); Debadeepta Dey, Bothell, WA (US); Sudipta Narayan Sinha, Redmond, WA (US); Shital Shah, Issaquah, WA (US); Ashish Kapoor, Kirkland, WA (US); Neel Suresh Joshi, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 174 days.

(21) Appl. No.: 15/593,556

(22) Filed: May 12, 2017

(65) Prior Publication Data
US 2018/0367728 A1   Dec. 20, 2018

Related U.S. Application Data

(60) Provisional application No. 62/446,119, filed on Jan. 13, 2017.

(51) Int. Cl.
*H04N 5/232* (2006.01)
*H04N 7/18* (2006.01)
(Continued)

(52) U.S. Cl.
CPC ....... *H04N 5/23222* (2013.01); *B64C 39/024* (2013.01); *G06T 7/73* (2017.01);
(Continued)

(58) Field of Classification Search
CPC ........... H04N 5/23222; H04N 5/23203; H04N 13/189; B64C 2201/127; B64C 39/024; G06T 7/73
See application file for complete search history.

(56) References Cited

U.S. PATENT DOCUMENTS 7,363,157 B1 *  4/2008  Hanna ................... G01C 11/00
                                                           702/5
9,486,921 B1 * 11/2016  Straszheim ............ B25J 9/1679
(Continued)

FOREIGN PATENT DOCUMENTS

WO        2015180133 A1    12/2015

OTHER PUBLICATIONS

Jiankun, Fan, "Optimal Path Planning and Control of Quadrotor Unmanned Aerial Vehicle for Area Coverage", In Dissertations & Theses of the University of Toledo, 2014, 2 pages.
(Continued)

*Primary Examiner* — Lin Ye
*Assistant Examiner* — John H Morehead, III

(57) ABSTRACT

Examples of the present disclosure relate to generating optimal scanning trajectories for 3D scenes. In an example, a moveable camera may gather information about a scene. During an initial pass, an initial trajectory may be used to gather an initial dataset. In order to generate an optimal trajectory, a reconstruction of the scene may be generated based on the initial data set. Surface points and a camera position graph may be generated based on the reconstruction. A subgradient may be determined, wherein the subgradient provides an additive approximation for the marginal reward associated with each camera position node in the camera position graph. The subgradient may be used to generate an optimal trajectory based on the marginal reward of each camera position node. The optimal trajectory may then be used by to gather additional data, which may be
(Continued)

iteratively analyzed and used to further refine and optimize subsequent trajectories.

20 Claims, 14 Drawing Sheets

(51) Int. Cl.
*H04N 13/189* (2018.01)
*G06T 19/00* (2011.01)
*G06T 7/73* (2017.01)
*B64C 39/02* (2006.01)

(52) U.S. Cl.
CPC ....... *G06T 19/003* (2013.01); *H04N 5/23203* (2013.01); *H04N 5/23206* (2013.01); *H04N 5/23299* (2018.08); *H04N 7/18* (2013.01); *H04N 7/185* (2013.01); *H04N 13/189* (2018.05); *B64C 2201/127* (2013.01)

(56) References Cited

U.S. PATENT DOCUMENTS

| | | | |
|---|---|---|---|
| 9,495,764 B1* | 11/2016 | Boardman | G06K 9/00201 |
| 2010/0066815 A1 | 3/2010 | Allen | |
| 2010/0268409 A1 | 10/2010 | Vian et al. | |
| 2012/0050524 A1* | 3/2012 | Rinner | G06T 3/40 |
| | | | 348/117 |
| 2014/0071299 A1* | 3/2014 | Grundmann | G06T 5/003 |
| | | | 348/207.1 |
| 2015/0112516 A1* | 4/2015 | Kruglick | B64C 39/024 |
| | | | 701/3 |
| 2015/0268058 A1* | 9/2015 | Samarasekera | G06K 9/00637 |
| | | | 701/409 |
| 2015/0370251 A1 | 12/2015 | Siegel et al. | |
| 2016/0004795 A1 | 1/2016 | Novak | |
| 2016/0018224 A1 | 1/2016 | Isler et al. | |
| 2016/0054737 A1 | 2/2016 | Soll et al. | |
| 2016/0083115 A1 | 3/2016 | Hess | |
| 2016/0202695 A1 | 7/2016 | Deroos et al. | |
| 2016/0271796 A1 | 9/2016 | Babu | |
| 2017/0053169 A1* | 2/2017 | Cuban | H04N 7/185 |
| 2017/0213070 A1* | 7/2017 | Aghamohammadi | B25J 9/163 |
| 2017/0291704 A1* | 10/2017 | Alegria | B64C 39/022 |

OTHER PUBLICATIONS

Fleureau, et al., "Generic Drone Control Platform for Autonomous Capture of Cinema Scenes", In Proceedings of the 2nd Workshop on Micro Aerial Vehicle Networks, Systems, and Applications for Civilian Use, Jun. 26, 2016, pp. 35-40.

Remondino, et al., "UAV Photogrammetry for Mapping and 3D Modeling—Current Status and Future Perspectives", In International Archives of Photogrammetry, Remote Sensing and Spatial Information Sciences, Sep. 2011, pp. 1-7.

Hoffmann, et al., "Quadrotor Helicopter Trajectory Tracking Control", In Journal of American Institute of Aeronautics and Astronautics, Aug. 18, 2008, pp. 1-14.

Yuan, et al., "Visual Steering of UAV in Unknown Environments", In Proceedings of IEEE/Rsj International Conference on Intelligent Robots and Systems, Oct. 11, 2009, pp. 3906-3911.

Blum, et al., "Approximation Algorithms for Orienteering and Discounted-Reward TSP", In SIAM Journal on Computing, vol. 37, Issue 2, Feb. 2007, pp. 1-18.

"International Search Report and Written Opinion Issued in PCT Application No. PCT/US2017/067158", dated Apr. 6, 2018, 10 Pages.

* cited by examiner

OPTIMAL SCANNING TRAJECTORIES FOR 3D SCENES

CROSS-REFERENCE TO RELATED APPLICATION

This application claims priority to U.S. Provisional Application No. 62/446,119, entitled "Optimal Scanning Trajectories for 3D Scenes," filed on Jan. 13, 2017, the entire disclosure of which is hereby incorporated by reference in its entirety.

BACKGROUND

Unmanned aerial vehicles (UAVs) typically have a camera that captures images as it travels a path designed by its operator. The UAV may be maneuvered by the operator along a trajectory that enables the camera to capture the scene from a variety of camera positions having different vantage points. Ideally, the scene would be observed in great detail, such that the reconstruction is as accurate and detailed as possible. However, a variety of constraints may make such an approach impossible (e.g., limited flight time, storage capacity constraints, etc.). As a result, a tradeoff may exist between the amount of data that may be collected by the camera and the costs associated with collecting the data.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for generating optimal scanning trajectories for unmanned aerial vehicles (UAVs) that capture 3D scenes using one or more cameras. For example, a drone or other moveable camera may be used to gather information about the scene. In an initial pass, the moveable camera may travel an initial trajectory that may be used to gather an initial dataset. The initial dataset may be analyzed to generate an optimal scanning trajectory that may then be used by the moveable camera to gather subsequent data. Further analysis of the initial and subsequent data may be performed in order to further refine or optimize a trajectory for scanning the scene. Further iterations and optimizations may be performed, continually refining and improving the flight trajectory based on newly-acquired information about the scene.

Generating an optimal trajectory may comprise generating a reconstruction of the scene based on previously-acquired data relating to the scene. One or more surface points may be generated within the reconstruction. Further, a camera position graph may be generated, wherein the camera position graph comprises one or more camera position nodes and edges. A subgradient may be determined, wherein the subgradient provides an additive approximation for the marginal reward associated with each camera position node in the camera position graph. The subgradient may then be used to generate an optimal flight trajectory based on the reward and cost associated with the camera position nodes and edges in the camera position graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
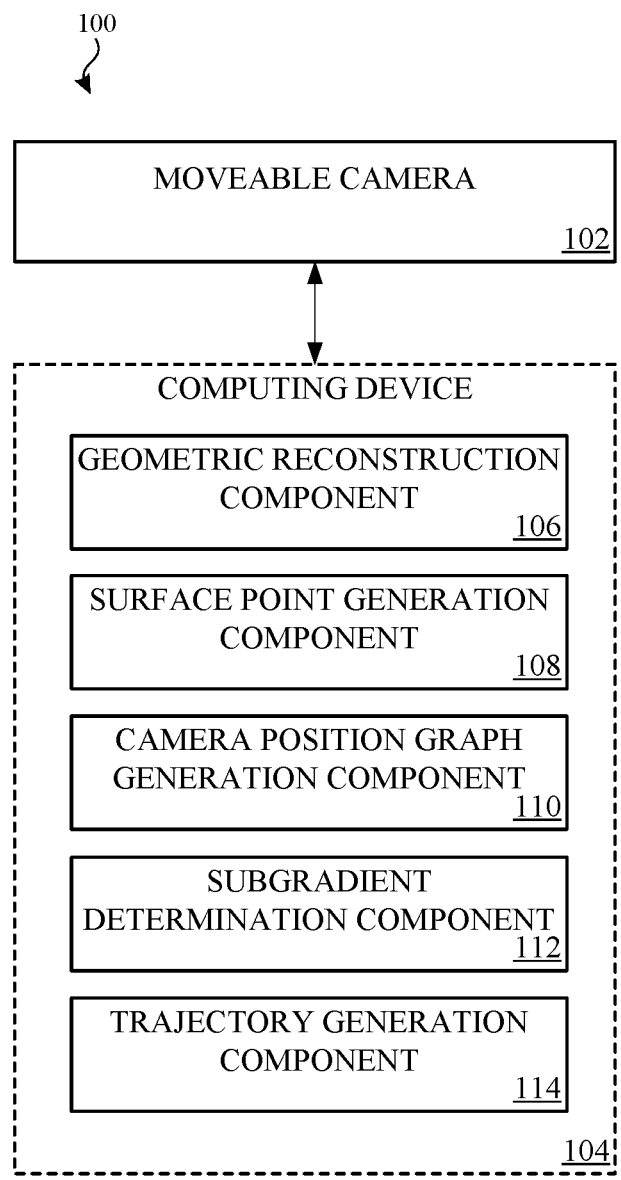
FIG. 1 illustrates an example system for generating optimal trajectories for a moveable camera that captures images used to create a 3D scene.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure generally relates to generating scanning trajectories for moveable cameras that are configured to scan a scene. The data collected from the scan may subsequently be used to create a 3D scene. In an example, a moveable camera (e.g., a drone, UAV, or any other manually- or automatically-positioned camera) may be used to capture data relating to a 3D scene. This data then may be used to generate an optimal scanning trajectory for the moveable camera. The optimal scanning trajectory may be used to capture additional information relating to the scene. In some examples, the process may be iterative, such that subsequent optimal trajectories for the moveable camera may be generated based on information captured using previously-generated trajectories. The process may repeat until a certain threshold is met (e.g., a certain quality or accuracy target is achieved, the size of the captured dataset reaches a predetermined threshold, etc.). The collected information may be used to generate a 3D model of the scene, perform measurements or calculations, among other uses.

A 3D scene may be a landmark, building, historical monument, or natural attraction, among others. In an example, a 3D scene may be the interior of a structure (e.g., a room, an office, a mall or other retail space, a vehicle, etc.), the exterior of a structure (e.g., a building, a patio or balcony, etc.), or any combination thereof. As will be appreciated, any type of scene may be scanned without departing from the spirit of this disclosure.

In some examples, a trajectory may be designated as "optimal" when the reward and cost associated with the trajectory have been analyzed or evaluated so as to obtain an additional or similar level of reward while incurring a similar or decreased level of cost. In an example, a reward associated with a trajectory may include the amount and/or quality of information captured, the ease with which the information was captured, or the amount of time required to capture the information, among others. In another example, a cost associated with a trajectory may include energy requirements of the moveable camera, the skill or maneuverability required in order to implement or navigate the trajectory, the amount of time required to navigate the trajectory, storage capacity requirements of the moveable camera, etc. In some examples, one or more rewards may be evaluated in view of one or more costs, thereby determining a marginal reward. As will be appreciated, other rewards or costs may be evaluated without departing from the spirit of this disclosure. Additionally, in some examples, a "cost" may in fact be a "reward," and vice versa. As an example, while the storage capacity of the moveable camera may be constrained in one instance, it may be the case that the reward is measured based on the size of the resulting dataset in another instance. In another example, one or more factors may be evaluated as both a cost and as a reward.

The moveable camera may be used to capture a variety of information relating to a 3D scene as it passes over the scene. In some examples, image, video, and/or audio data may be captured. The moveable camera may have additional hardware used to capture depth or other geometric information, including, but not limited to, Light Detection and Ranging (LIDAR) sensors, infrared (IR) emitters and/or sensors, or stereoscopic sensors. In other examples, additional information may be gathered, such as data from one or more moveable cameras used when navigating the trajectory (e.g., GPS coordinates, barometric sensor data, attitude, pitch, roll, yaw, altitude, speed, etc.) or environmental data (e.g., climate conditions, wind speed, temperature, visibility, etc.), among other information (e.g., time, date, or information relating to the hardware, trajectory, or 3D scene, among others).

FIG. 1 illustrates an example system 100 for generating optimal trajectories for a moveable camera for capturing images used to create a 3D scene. Example system 100 comprises moveable camera 102 and computing device 104. Moveable camera 102 may be a UAV, a drone, or other camera. In some examples, moveable camera 102 may be positioned or controlled manually or automatically. While only one moveable camera is shown in FIG. 1, it will be appreciated that multiple moveable cameras may be used without departing from the spirit of this disclosure.

Computing device 104 is comprised of geometric reconstruction component 106, surface point generation component 108, camera position graph generation component 110, subgradient determination component 112, and trajectory generation component 114. Computing device 104 may be a personal computing device, tablet computing device, mobile computing device, or distributed computing device, among others. While computing device 104 is illustrated as separate from moveable camera 102, moveable camera 102 may comprise computing device 104 and one or more of components 106-114. In another example, moveable camera 102 may comprise one or more or components 106-114, while computing device 104 comprises one or more of the other components. In another example, computing device 104 may be a distributed computing device such that multiple computing devices are used to perform the functions of components 106-114. Additionally, components 106-114 may be hardware components, software components, or some combination thereof.

Moveable camera 102 may provide information relating to a 3D scene to computing device 104. Additionally, computing device 104 may provide one or more trajectories to moveable camera 102. In some examples, computing device 104 may provide the trajectories based on information received from moveable camera 102. In other examples, computing device 104 may provide a trajectory without having received information from moveable camera 102. The trajectory may be based on one or more parameters relating to the 3D scene, including, but not limited to, bounding dimensions for the scene (e.g., as geographical coordinates, measurements, etc.), a zone in which it is safe to operate (e.g., above or within a 3D scene, a specified distance above or away from obstacles, etc.), among others.

When evaluating information received from moveable camera 102, geometric reconstruction component 106 may be used to reconstruct at least a portion of the 3D scene. Geometric reconstruction component 106 may use a variety of techniques to reconstruct the 3D scene based on the received information, including, but not limited to, triangulating feature points as observed in image or video data from varying angles, generating a depth map using stereo image or video data, or determining geometric data from LIDAR or IR data. The reconstruction may then be used by other components when generating an optimal trajectory for the moveable camera.

In some examples, surface point generation component 108 may generate one or more surface points using the geometric reconstruction generated by geometric reconstruction component 106. As will be discussed in greater detail with respect to FIG. 5, a surface point may be a point within a scene or geometric reconstruction that may be visible from one or more camera positions. In an example, a surface light field may be defined as a shape surrounding the surface point. A solid angle may be a region of the surface light field that represents the observable data of the surface point from a camera at a given camera position. As such, coverage of the surface point from one or more camera positions may be measured based the area of solid angles on the surface light field associated with the surface point.

Surface points may be generated within the geometric reconstruction based on one or more rules or algorithms (e.g., such that surface points are distributed among certain detected features of the geometric reconstruction, such that a certain percentage of surface points are visible from a given camera position, etc.) or may be distributed randomly (e.g., according to a uniform distribution, a standard distribution, etc.), among others. The quantity of generated surface points may be determined based on a prior indication (e.g., a constant value, a value proportional to the scanned area or volume, etc.) or may be dynamically determined based on one or more characteristics or attributes of the 3D scene, moveable camera 102, or environmental conditions, among others.

Camera position graph generation component 110 may generate a graph of one or more possible camera positions relating to the 3D scene. The graph may be comprised of camera position nodes and edges. Each camera position node may indicate a camera position, while an edge between two camera position nodes may indicate a path (and an associated cost) between the two camera position nodes. In some examples, the graph may be generated based on a geometric reconstruction (e.g., as reconstructed by geometric reconstruction component 106) and/or one or more surface points (e.g., as generated by surface point generation component 108), based on one or more rules or algorithms (e.g., such that the camera position nodes are distributed among certain detected features of the reconstruction, such that a certain percentage of surface points are visible from a given camera position node, etc.), or may be distributed randomly (e.g., according to a uniform distribution, a standard distribution, etc.), among others. The size of the graph (e.g., the number of camera position nodes, the interconnectedness of the graph, etc.) may be determined based on a prior indication (e.g., a constant value, a value proportional to the scanned area or volume, etc.) or may be dynamically determined based on one or more characteristics or attributes of the scene, moveable camera 102, the geometric reconstruction, the associated surface points, or environmental conditions, among others.

Subgradient determination component 112 may be used to determine a subgradient associated with a camera position graph (e.g., which may have been generated by camera position graph generation component 110). A reward associated with a camera position used to observe a surface point may not be additive. Rather the reward may be submodular, because if a nearby camera position was already used to observe the surface point, the amount of additional gathered information relating to the surface point is less than if the surface point was previously unobserved. Thus, while a camera position may have a high reward initially, the reward associated with the camera position may decrease as camera positions are added to the computed trajectory. As such, a subgradient may be determined in order to provide an additive approximation of the marginal reward for each camera position node. In some examples, subgradient determination component 112 may determine the subgradient by sorting the camera position nodes of the camera position graph by decreasing marginal reward. Sorting may comprise selecting the node with the highest marginal reward, and then continually selecting the node with the next-highest marginal reward in view of the nodes that have already been selected. The subgroup comprised of the sequence of sorted nodes may then be used to additively approximate the nodes in the camera position graph.

Trajectory generation component 114 may generate an optimal trajectory, which may then be provided to moveable camera 102 by computing device 104. Trajectory generation component may use information received from moveable camera 102 or data generated by at least one of components 106-114, or it may provide a trajectory without having first received information or data from moveable camera 102 or at least one of components 106-114. In one example, trajectory generation component 114 may receive one or more parameters that may be used to generate a trajectory, including, but not limited to, a bounding rectangle for the scene (e.g., as geographical coordinates, measurements, etc.) or a zone in which it is safe to operate (e.g., above or within a 3D scene, a specified distance above or away from obstacles, etc.), among others. As an example, trajectory generation component 114 may generate an initial trajectory for moveable camera 102 absent any previous knowledge of the scene.

In another example, trajectory generation component 114 may use information relating to the scene, such as information provided or generated by at least one of components 106-112. As an example, a subgradient (e.g., as may be determined by subgradient determination component 112) may be used in conjunction with a camera position graph (e.g., as may be generated by camera position graph generation component 110). Given that the subgradient provides an additive approximation for the submodular nature of each camera position node's marginal reward within the camera position graph, an optimal trajectory may be generated by evaluating the problem as an orienteering problem that may be formulated and solved as an integer linear program (ILP). As will be appreciated, a variety of algorithms may be used to solve the resulting ILP, including, but not limited to, a branch-and-bound algorithm or a branch-and-cut algorithm. Thus, an optimal trajectory may be determined based on the camera position nodes and edges that were determined to provide an optimal level of reward in relation to the cost incurred.

Figure 2:
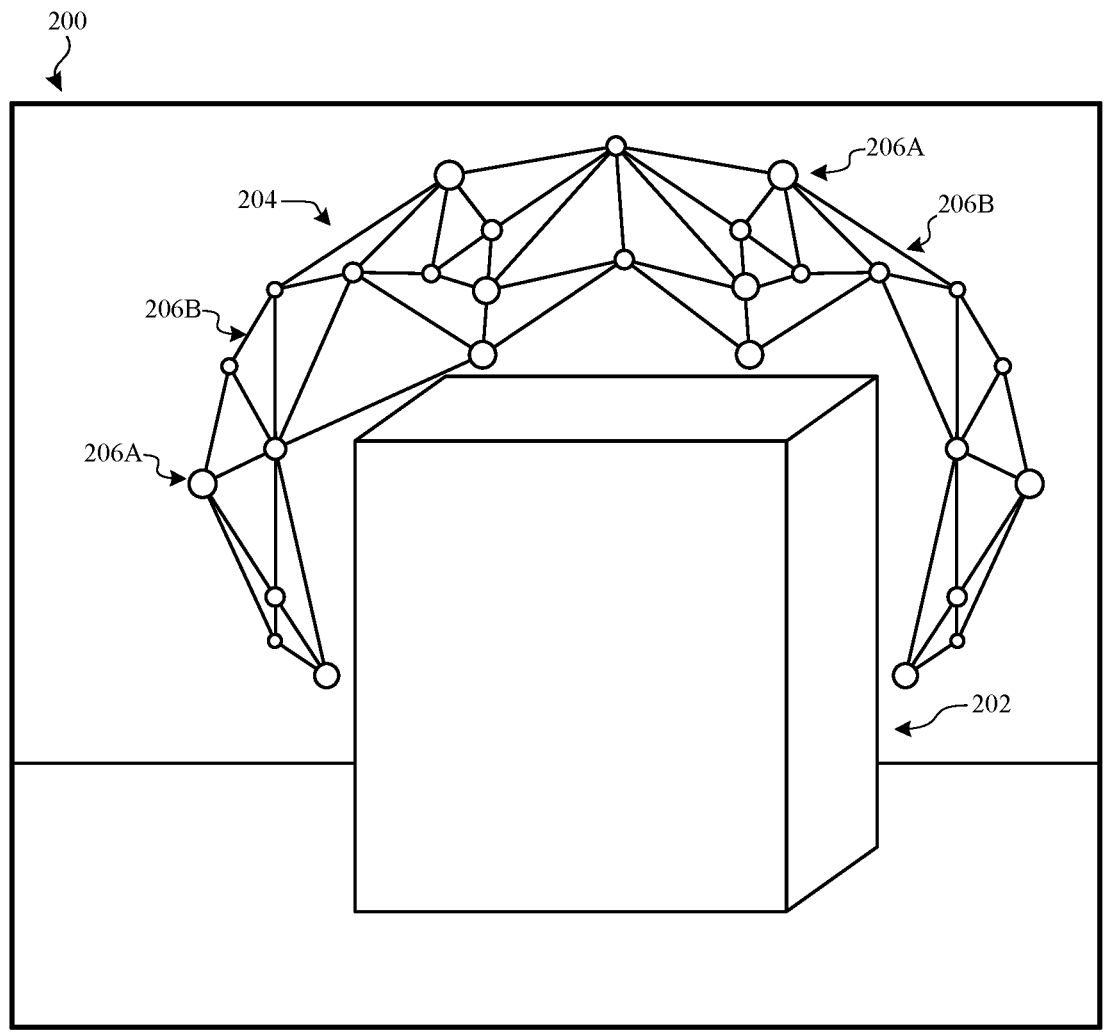
FIG. 2 illustrates an example scene for which an optimal trajectory for a moveable camera may be generated.

FIG. 2 illustrates an example scene 200 for which an optimal trajectory for a moveable camera may be generated. Scene 200 is comprised of object 202 and camera position graph 204. As discussed above, object 202 may be an interior object, an exterior object, or a combination thereof. In order to generate an optimal trajectory to scan object 202, camera position graph 204 may be generated. In an example, camera position graph 204 may be generated using a camera position graph generation component, such as camera position graph generation component 110 in FIG. 1.

Camera position graph 204 may be comprised of one or more potential camera position nodes 206A, between which one or more edges 206B may exist. As discussed above, rewards may be associated with camera position nodes 206A, while costs may be associated with edges 206B. Camera position nodes 206A may be determined such that they provide a variety of different vantage points or perspectives of object 202. As an example, they may be determined randomly (e.g., according to a uniform distribution, a standard distribution, etc.) or based on information relating to object 202 (e.g., gathered from a previous scan, received as one or more parameters, etc.), among others. Edges 206B may be determined based on similar considerations. An optimal flight trajectory for a moveable camera may then be generated by identifying a set of camera position nodes and a set of edges from camera position graph 204 according to aspects disclosed herein.

Figure 3:
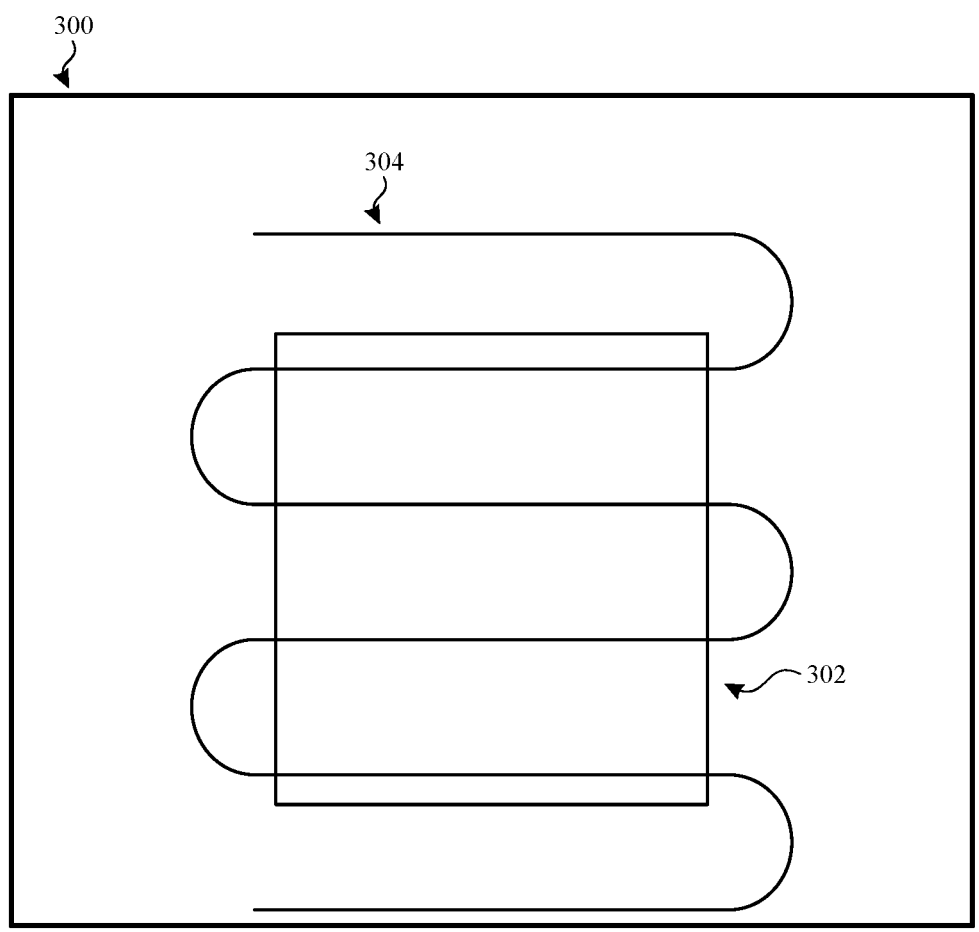
FIG. 3 illustrates an example scene for which an optimal trajectory for a moveable camera may be generated.

FIG. 3 illustrates an example scene 300 for which an optimal trajectory for a moveable camera may be generated.

Scene 300 comprises object 302 and flight path 304. In an example, scene 300 may be an overhead view of scene 200. Flight path 304 may be an initial flight path generated by a computing device (e.g., computing device 104 in FIG. 1) and provided to a moveable camera (e.g., moveable camera 102). The moveable camera may use flight path 304 to perform a scan of scene 300 and object 302. In some examples, flight path 304 may be generated based on one or more indications that provide information relating to scene 300, object 302, or the moveable camera, among others. As an example, an indication may include a region in which the moveable camera may operate or should avoid (e.g., a safe height above scene 300, the location of obstacles to avoid, etc.), as well as a target region that the moveable camera should scan, among others. Data gathered by the moveable camera using flight path 304 may be used when generating an optimal trajectory. In an example, the data may be used by components 106-114 in FIG. 1. As will be appreciated, a variety of trajectories (e.g., having a different pattern, different or varying altitudes, or multiple passes, among other characteristics) may be used without departing from the spirit of this disclosure.

Figure 4:
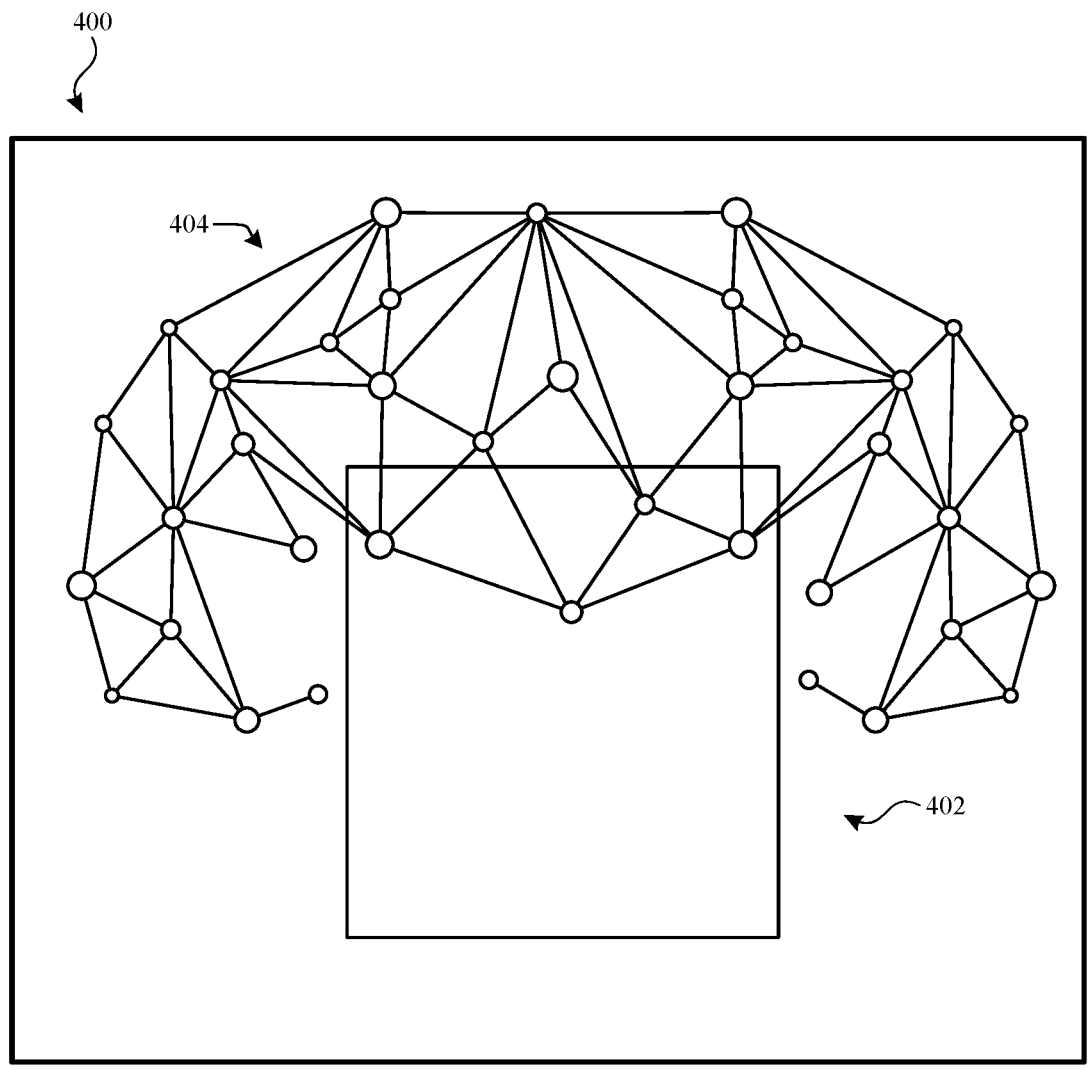
FIG. 4 illustrates an example scene for which an optimal trajectory for a moveable camera may be generated.

FIG. 4 illustrates an example scene 400 for which an optimal trajectory for a moveable camera may be generated. Scene 400 comprises object 402 and camera position graph 404. In an example, scene 400 may be a side view of scene 200. In an example, camera position graph 404 may be generated using a camera position graph generation component, such as camera position graph generation component 110 in FIG. 1. Further, camera position graph 404 may be generated based on information collected from an initial trajectory, such as flight path 304 in FIG. 3. The collected information may be processed using aspects disclosed herein in order to generate camera position graph 404 from which an optimal set of camera position nodes and edges may be determined (e.g., using at least one of components 106-114).

Figure 5:
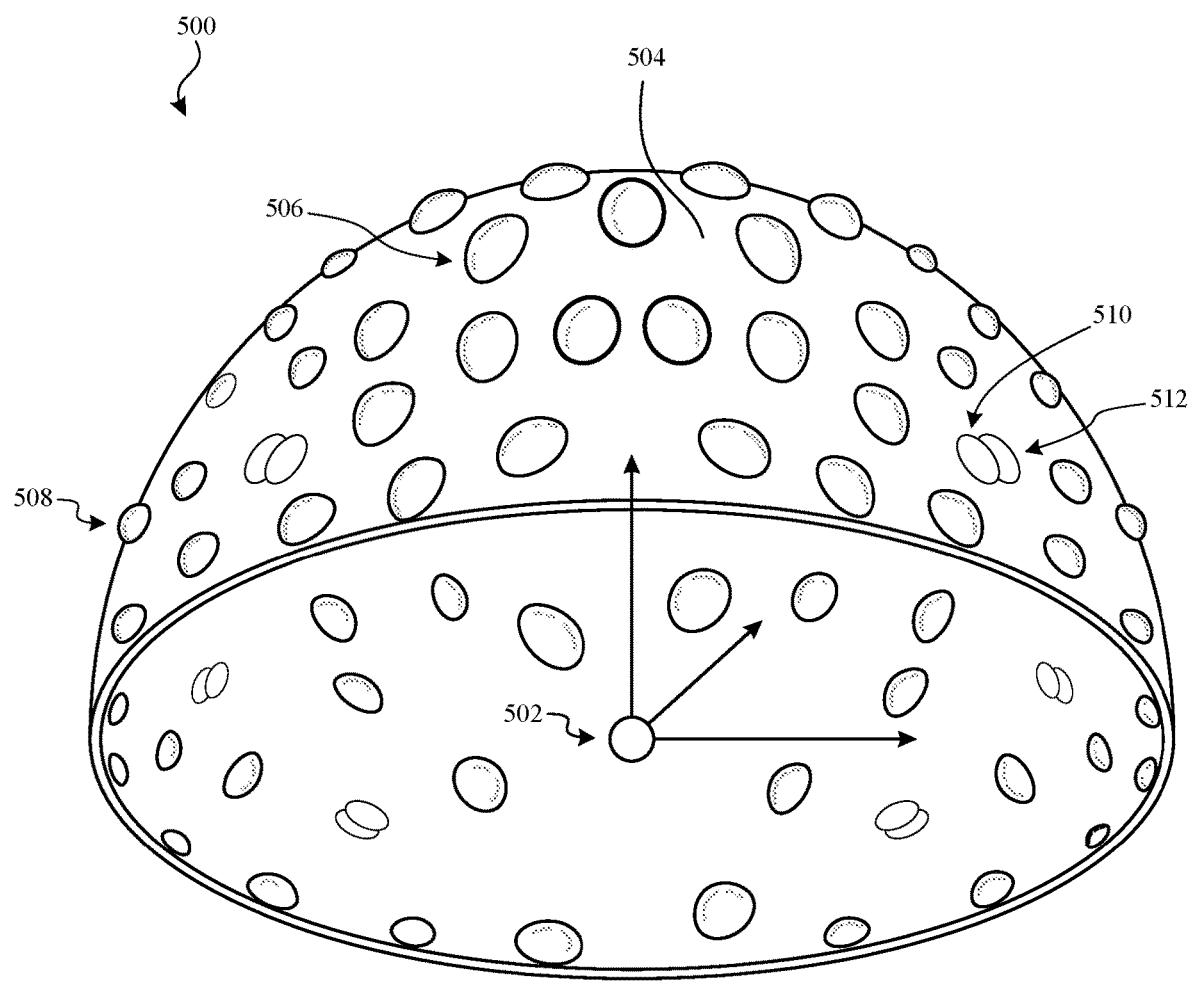
FIG. 5 illustrates an example surface light field coverage diagram which may be used when generating an optimal trajectory for a moveable camera.

FIG. 5 illustrates an example surface light field coverage diagram 500 which may be used when generating an optimal trajectory for the moveable camera. Surface light field coverage diagram 500 comprises surface point 502, surface light field 504, and solid angles 506-512. Surface point 502 may be a point within a scene. In one example, surface point 502 may be a surface point that was generated by surface point generation component 108 in FIG. 1 using reconstructed scene information from geometric reconstruction component 106. Surface light field 504 may surround surface point 502. While surface light field 504 is pictured as a hemisphere, it will be appreciated that surface light field 504 may be other shape (e.g., at least a subpart of a sphere, a cylinder, etc.) without departing from the spirit of this disclosure.

Surface light field 504 may represent possible perspectives from which surface point 502 may be observed. A solid angle (e.g., solid angles 506-512) of surface light field 504 may indicate a region that may be observed from a given camera position. In some examples, this region may be used when determining a reward for the camera position associated with a solid angle. Further, different camera positions may provide different coverage of surface point 502. As an example, a camera position having a grazing angle (e.g., such as that of solid angle 508) may provide less coverage, and therefore a lower reward, for surface point 502 than other camera positions (e.g., that of camera position 506, which is more directly above surface point 502 and therefore may enable the moveable camera to capture more information). Additionally, overlapping solid angles (e.g., solid angle 510 and solid angle 512) may provide a diminishing reward if both associated camera positions are used, given that both associated camera positions provide similar coverage of surface point 502. As a result, the solid angles 506-512 may be weighted or prioritized accordingly when each associated camera position is being evaluated (e.g., by subgradient determination component 112 and/or trajectory generation component 114 in FIG. 1).

In some examples, coverage of one or more surface points by one or more cameras may be represented using a matrix, wherein the rows of the matrix may be associated with surface light field samples and the columns of the matrix may be associated with camera position nodes in the camera position graph. If a surface point associated with a surface light field sample is observable by a given camera position node, a value may be stored in the matrix at the appropriate row and column. Columns of the matrix may then be selected to generate a resulting matrix (representing a trajectory comprising camera position nodes associated with the selected columns), which may then be used to determine the coverage of each surface point for the selected set of camera position nodes. In an example, the initial matrix may be multiplied by a weighting matrix, wherein the weighting matrix is comprised of weights associated with the surface light field samples that indicate the relative value (e.g., quality, observability, etc.) of a surface light field sample with respect to the associated surface point.

Figure 6:
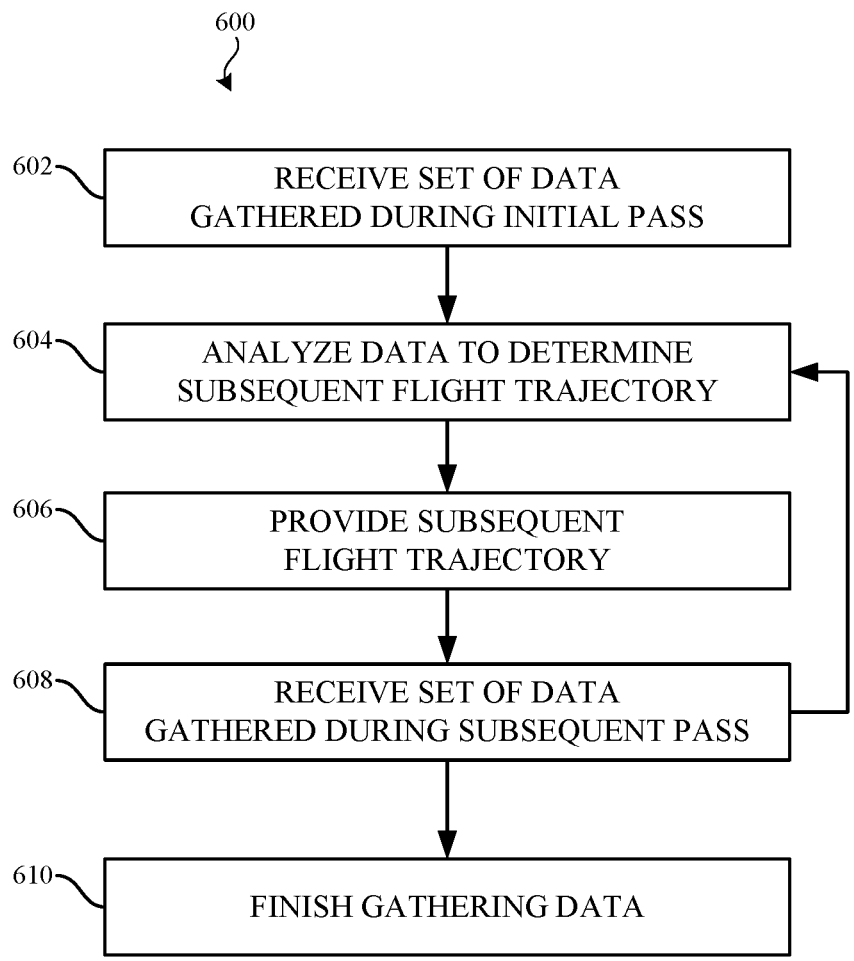
FIG. 6 illustrates an example method for generating an optimal trajectory for a moveable camera capturing images used to create a 3D scene.

FIG. 6 illustrates an example method 600 for generating an optimal trajectory for a moveable camera capturing images used to create a 3D scene. Method 600 may be performed by a computing device such as computing device 104 in FIG. 1. Method 600 begins at operation 602, where a set of data gathered during an initial pass may be received. The data maybe received from a moveable camera, such as moveable camera 102 in FIG. 1. In one example, the data may have been provided by a moveable camera by performing an initial flight pass such as flight path 304 in FIG. 3. The received data may comprise image data, video data, audio data, data relating to depth, and/or other geometric information. In some examples, additional information may be received, such as data generated by one or more moveable cameras that performed the initial pass (e.g., GPS coordinates, barometric sensor data, attitude, pitch, roll, yaw, altitude, speed, etc.) or environmental data (e.g., climate conditions, wind speed, temperature, visibility, etc.), among other information (e.g., time, date, or information relating to the hardware, trajectory, or 3D scene, among others).

Moving to operation 604, the received data may be analyzed to determine a subsequent flight trajectory. Data analysis may be performed by computing device 104 in FIG. 1 (e.g., using at least one of components 106-114). In an example, analyzing the data may comprise generating a scene reconstruction using at least a portion of the received data, generating one or more surface points in the reconstructed scene, generating a camera position graph, determining a subgradient, and/or generating a trajectory. As discussed herein, the subsequent trajectory may be determined by evaluating the reward of the trajectory in view of the cost.

At operation 606, the subsequent flight trajectory may be provided to a moveable camera (e.g., moveable camera 102 in FIG. 1). In some examples, there may be a plurality of cameras to which at least a portion of the subsequent trajectory may be provided. The subsequent trajectory may be provided using any method of communication, including, but not limited to, wireless or wired communication methods. In other examples, the subsequent trajectory may be provided to a component on the same or different computing device as was used to determine the subsequent flight trajectory. The component may instruct or control one or more moveable cameras based on the provided flight trajectory.

Moving to operation 608, a set of data gathered during a subsequent pass may be received. In an example, the data may have been captured by one or more moveable cameras using the subsequent flight trajectory. The received data may comprise image data, video data, audio data, data relating to depth, and/or other geometric information. In some examples, additional information may be received, such as data generated by one or more moveable cameras that performed the initial pass or environmental data, among other information.

In one example, flow may move from operation 608 to operation 604, where the data received in operation 608 may be used at operation 604 to perform analysis and determine a subsequent flight trajectory for the moveable camera. In some examples, other previously received data (e.g., data that was gathered during the initial pass or other subsequent passes) may be used in addition to the data that was received in operation 608. Flow may then continue to operations 606 and 608, where the newly-determined subsequent flight trajectory may be provided and data using the subsequent flight trajectory may be received. Flow may loop between operations 604, 606, and 608. Eventually flow may progress instead to operation 610. Flow may instead branch to operation 610 as a result of the satisfaction of one or more conditions (e.g., a specific number of passes have been made, subsequent flight trajectories have yielded diminishing optimization benefits, etc.).

In another example (or as a result of satisfying one or more conditions), flow may progress from operation 608 to operation 610, where data gathering may be completed. At least a portion of the gathered data may be used to perform a variety of computations, such as generating a 3D model of the scene or performing measurements or calculations, among other uses. Flow terminates at operation 610.

Figure 7:
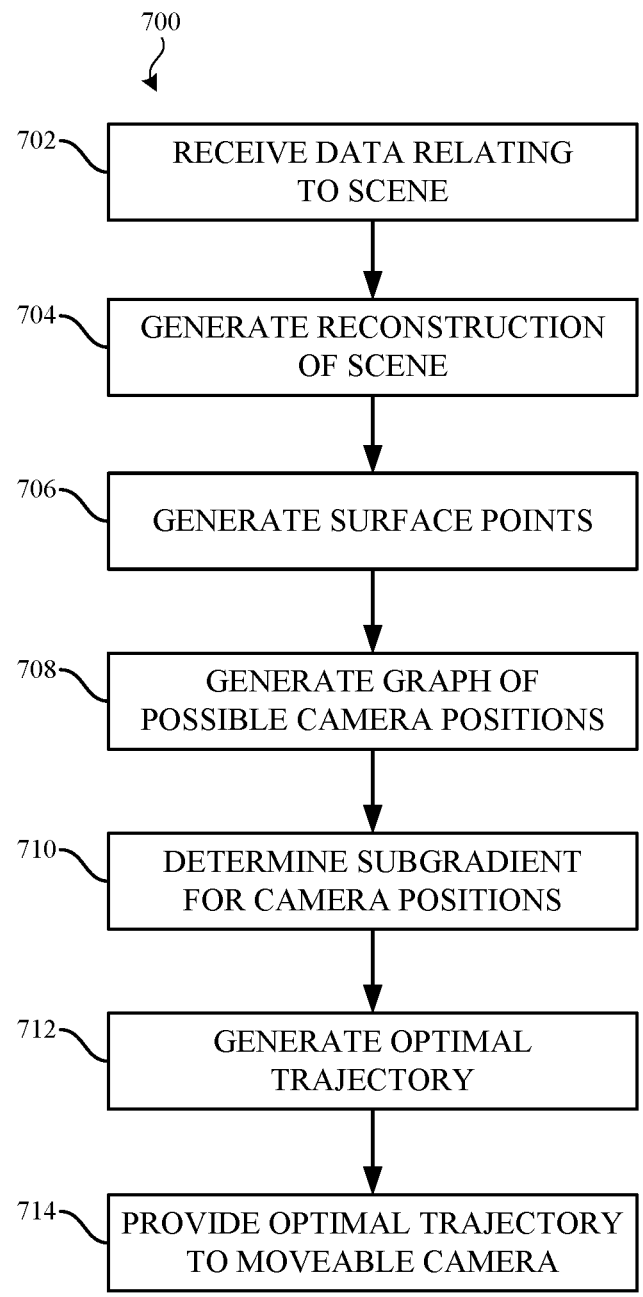
FIG. 7 illustrates an example method for analyzing data to generate a subsequent flight trajectory for a moveable camera.

FIG. 7 illustrates an example method 700 for analyzing data to generate a subsequent flight trajectory for a moveable camera. Method 700 may be performed by a computing device (e.g., computing device 104 in FIG. 1). Method 700 begins at operation 702, where data relating to a scene may be received. The data may be received from a moveable camera, such as moveable camera 102 in FIG. 1. At operation 704, at least a portion of the received data may be used to generate a reconstruction of the scene. Generating the reconstruction may be performed by geometric reconstruction component 106 in FIG. 1.

Moving to operation 706, one or more surface points may be generated. In an example, surface points may be generated using surface point generation component 106 in FIG. 1. The one or more surface points may be generated based on the reconstructed scene that was generated in operation 704. At operation 708, a graph of possible camera positions may be generated (e.g., using camera point graph generation component 110 in FIG. 1). The graph of possible camera positions may comprise one or more camera position nodes and edges among the camera position nodes as disclosed herein.

At operation 710, a subgradient may be determined for the camera positions. As an example, the subgradient may be determined by subgradient determination component 112 in FIG. 1. In one example, determining a subgradient may comprise performing method 800 in FIG. 8, which will be described in greater detail below. The subgradient may be generated based on information received or generated in at least one of previous operations 702-708. As discussed above, the subgradient may be determined such that camera position nodes are sorted based on decreasing marginal reward, wherein each subsequent camera position node is selected based on the decreasing marginal reward for that camera position node in view of previously-selected camera position nodes.

Moving to operation 712, an optimal trajectory may be generated. In some examples, the optimal trajectory may be generated based on at least a part of information received or generated in at least one of pervious operations 702-710. In some examples, the trajectory may be generated using trajectory generation component 114 in FIG. 1. In another example, the trajectory may be generated using the camera position graph and the subgradient from operations 708 and 710, respectively. The subgradient may provide an additive approximation of the marginal reward associated with each camera position node in the camera position graph, which may be formulated as an orienteering problem and solved as an ILP.

At operation 714, the optimal trajectory may be provided to a moveable camera. In some examples, the trajectory may be provided to one or more moveable cameras (e.g., moveable camera 102 in FIG. 1). The trajectory may be provided using any method of communication, including, but not limited to, wireless or wired communication methods. In an example, the trajectory may be provided to the same or different computing device as was used to determine perform at least a part of method 700. The component may instruct or control one or more moveable cameras based on the provided flight trajectory. Flow terminates at operation 714.

Figure 8:
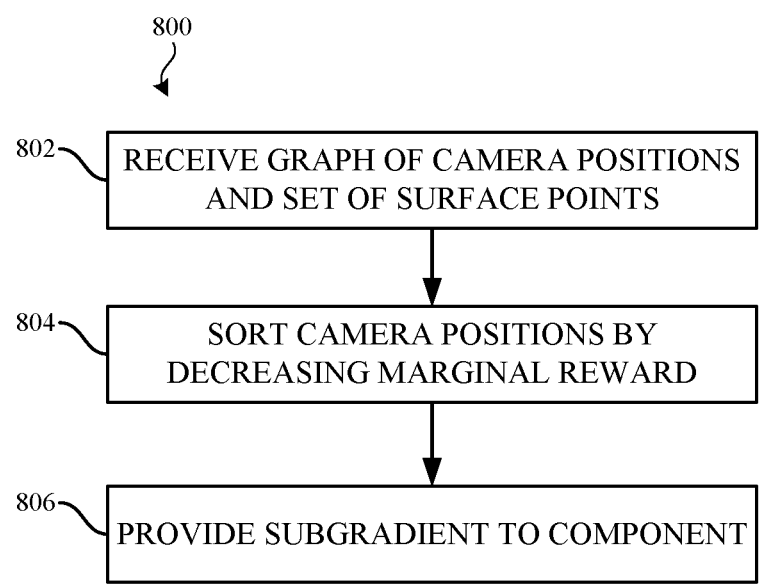
FIG. 8 illustrates an example method for generating a subgradient for approximating the marginal reward of one or more camera positions.

FIG. 8 illustrates an example method 800 for generating a subgradient for approximating the marginal reward of one or more camera positions. Method 800 may be performed by a computing device such as computing device 104 in FIG. 1. Method 800 begins at operation 802, where a camera position graph and a set of surface points may be received. The camera position graph may comprise one or more camera positions nodes and one or more edges among the camera position nodes.

Moving to operation 804, the camera position nodes in the camera position graph may be sorted based on decreasing marginal reward. Sorting may comprise selecting the camera position node with the highest marginal reward, and selecting subsequent nodes based on next-highest marginal reward in view of the camera position nodes that have already been selected. A marginal reward associated with a camera position may be determined by comparing the reward and the cost as defined herein. In an example, a surface light field (e.g., surface light field 504 in FIG. 5) for each surface point may be populated with a solid angle relating to each camera position node to which the surface point is visible. The surface light fields may then be used to determine a reward associated with each camera position, wherein the reward is based on the surface light field for each camera position node observable by the camera. This sequence of sorted nodes is a subgradient that may then be used to additively approximate the camera position nodes within the camera position graph. At operation 806, the subgradient may be provided. As an example, the subgradient may be provided to a component (e.g., trajectory generation component 114 in FIG. 1), a computing device, or a moveable camera. Flow terminates at operation 806.

Figure 9:
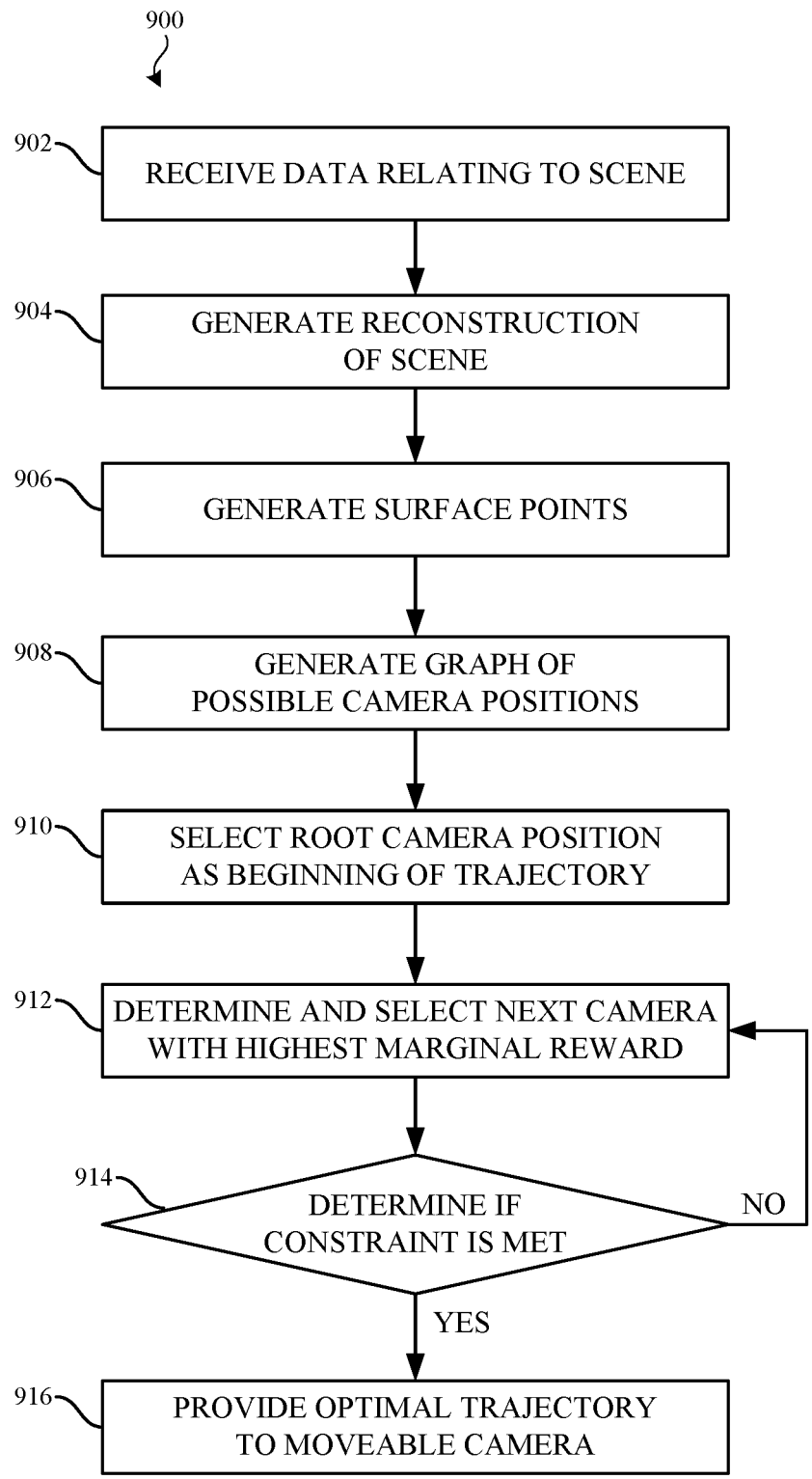
FIG. 9 illustrates an example method for analyzing data to generate a subsequent flight trajectory for a moveable camera.

FIG. 9 illustrates an example method 900 for analyzing data to generate a subsequent flight trajectory for a moveable camera. Method 900 begins at operation 902, where data relating to a scene may be received. The data maybe received from a moveable camera, such as moveable camera 102 in FIG. 1. At operation 904, at least a portion of the received data may be used to generate a reconstruction of the scene. Generating the reconstruction may be performed by geometric reconstruction component 106 in FIG. 1.

Moving to operation 906, one or more surface points may be generated. In an example, surface points may be generated using surface point generation component 106 in FIG. 1. The one or more surface points may be generated based on the reconstructed scene that was generated in operation 904. At operation 908, a graph of possible camera positions may be generated (e.g., using camera point graph generation component 110 in FIG. 1). The graph of possible camera positions may comprise one or more camera position nodes and edges among the camera position nodes as disclosed herein.

At operation 910, a root camera position may be selected as the first camera position of the trajectory. The root camera position may be determined based on one or more rules or algorithms, or it may be determined randomly, among others. In an example, the root camera position may be determined by comparing the marginal reward associated with each camera position node in the camera position graph, wherein the marginal reward may be a comparison of the reward and cost associated with a camera position node.

Moving to operation 912, the camera position node having the next-highest marginal reward may be selected and added to the trajectory. The marginal reward associated with a camera position node may be determined in view of the camera position nodes that are already included in the trajectory, such that candidate camera position nodes providing similar information to camera position nodes already in the flight trajectory have a decreased marginal reward.

At determination operation 914, a determination may be made whether a constraint is met. In some examples, a plurality of constraints may be evaluated. A constraint may relate to a variety of factors, including, but not limited to, the quantity or quality of information collected, the amount of energy required to navigate the currently-generated trajectory, or the amount of camera position nodes currently included in the trajectory. If it is determined at operation 914 that the constraint is not met, flow branches to operation 912, where another camera position node may be added to the trajectory as discussed above. Flow may loop between operations 912 and 914 until the constraint is met.

By contrast, if it is determined that the constraint is met, flow proceeds to operation 916, where the generated trajectory may be provided. In some examples, the trajectory may be provided to one or more moveable cameras (e.g., moveable camera 102 in FIG. 1). The trajectory may be provided using any method of communication, including, but not limited to, wireless or wired communication methods. In an example, the trajectory may be provided to the same or different computing device as was used to determine perform at least a part of method 900. The component may instruct or control one or more moveable cameras based on the provided flight trajectory. Flow terminates at operation 916.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of electronic device configurations that may be utilized for practicing aspects of the disclosure, as described herein.

Figure 10:
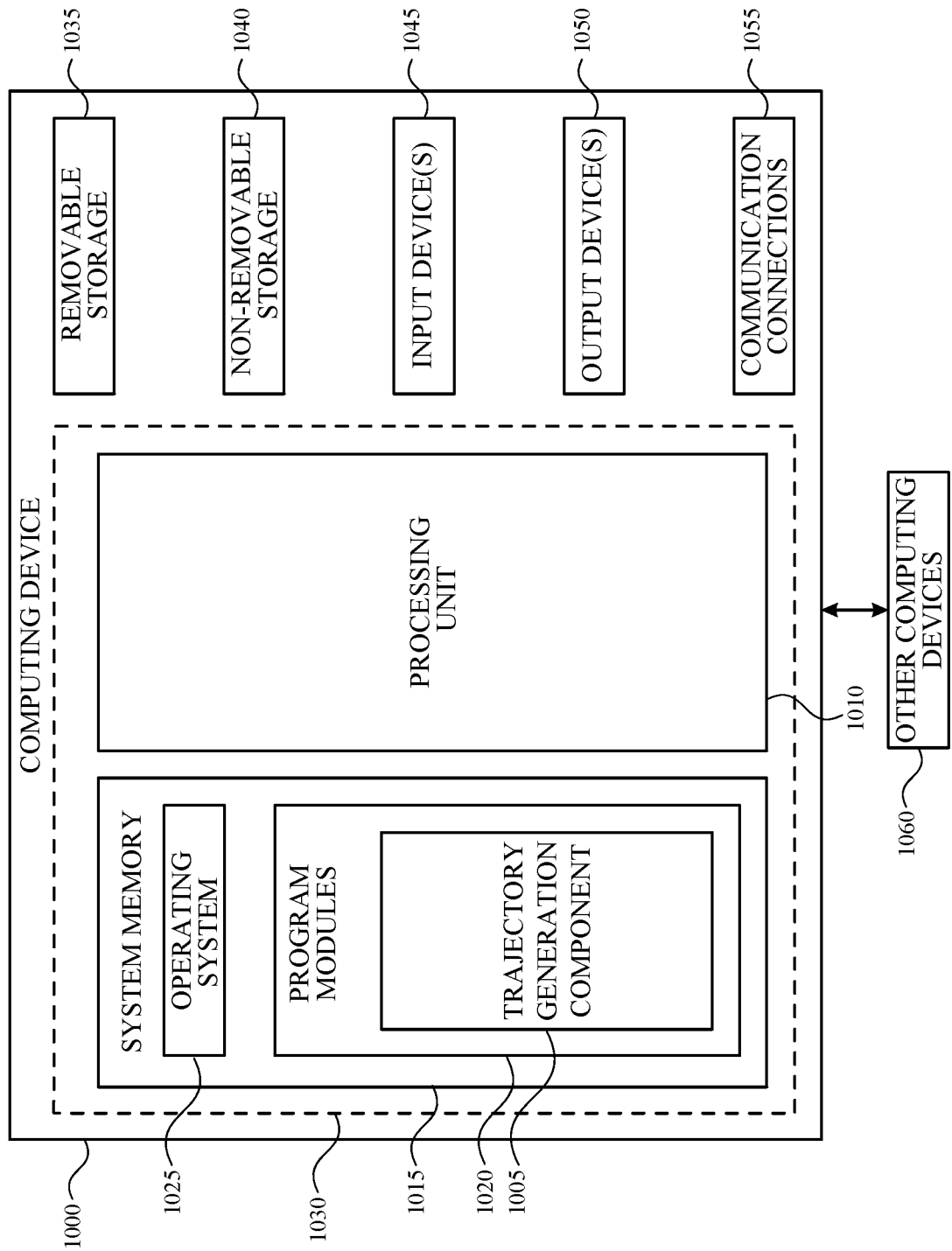
FIG. 10 is a block diagram illustrating example physical components of a computing device with which aspects of the disclosure may be practiced.

FIG. 10 is a block diagram illustrating physical components (e.g., hardware) of an electronic device 1000 with which aspects of the disclosure may be practiced. The components of the electronic device 1000 described below may have computer executable instructions for generating a mailto link in an electronic communication application such as described above.

In a basic configuration, the electronic device 1000 may include at least one processing unit 1010 and a system memory 1015. Depending on the configuration and type of electronic device, the system memory 1015 may comprise, but is not limited to, volatile storage (e.g., random access memory), non-volatile storage (e.g., read-only memory), flash memory, or any combination of such memories. The system memory 1015 may include an operating system 1025 and one or more program modules 1020 suitable for parsing received responses, generating electronic messages, updating attendee lists and so on.

The operating system 1025, for example, may be suitable for controlling the operation of the electronic device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1030.

The electronic device 1000 may have additional features or functionality. For example, the electronic device 1000 may also include additional data storage devices (removable and/or non-removable) such as, for example, magnetic disks, optical disks, or tape. Such additional storage is illustrated in FIG. 10 by a removable storage device 1035 and a non-removable storage device 1040.

As stated above, a number of program modules and data files may be stored in the system memory 1015. While executing on the processing unit 1010, the program modules 1020 (e.g., the trajectory generation component 1005) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of the client to switch protocols may be operated via application-specific logic integrated with other components of the electronic device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The electronic device 1000 may also have one or more input device(s) 1045 such as a keyboard, a trackpad, a mouse, a pen, a sound or voice input device, a touch, force and/or swipe input device, etc. The output device(s) 1050 such as a display, speakers, a printer, etc. may also be included. The aforementioned devices are examples and others may be used. The electronic device 1000 may include one or more communication connections 1055 allowing communications with other electronic devices 1060. Examples of suitable communication connections 1055 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1015, the removable storage device 1035, and the non-removable storage device 1040 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1000. Any such computer storage media may be part of the electronic device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
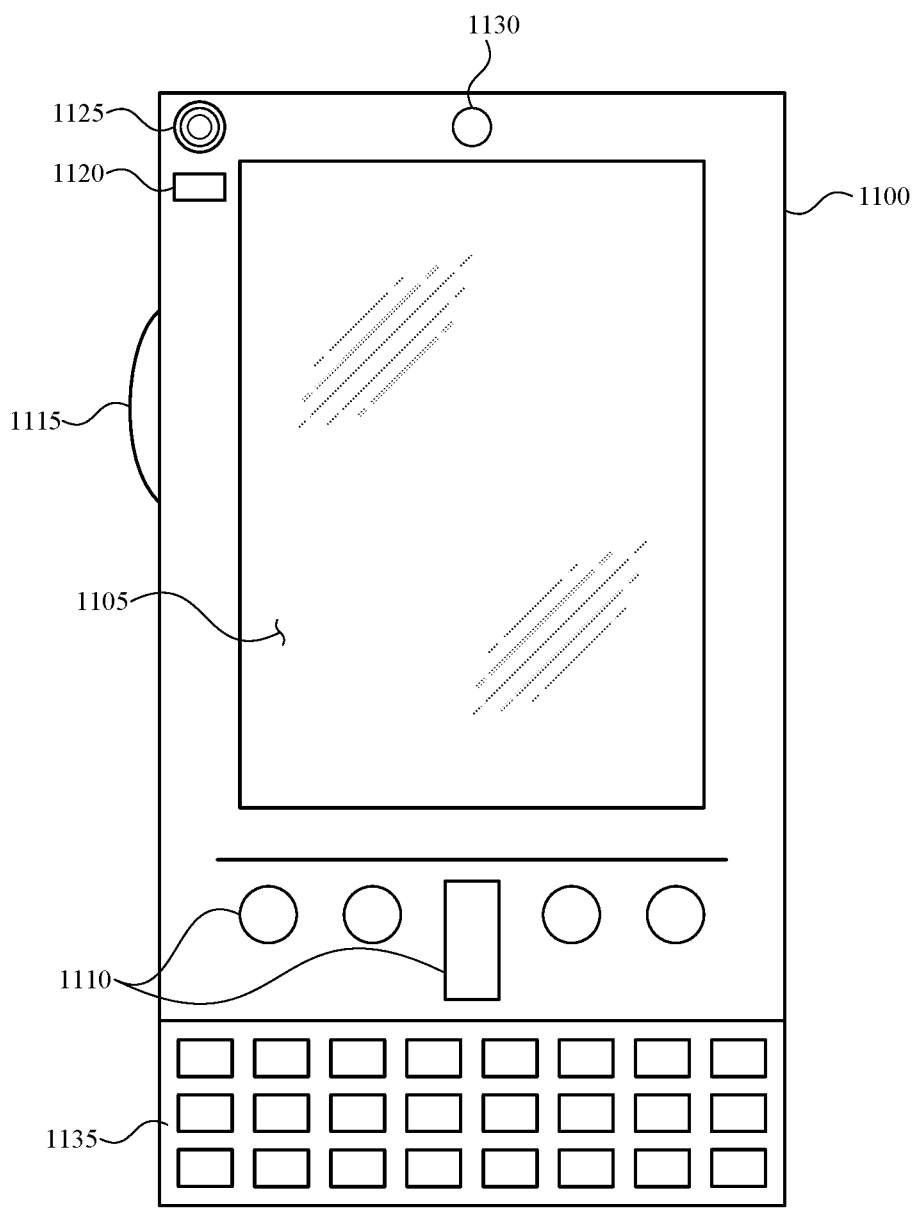
FIGS. 11A and 11B are simplified block diagrams of a mobile computing device with which aspects of the present disclosure may be practiced.
Figure 11B:
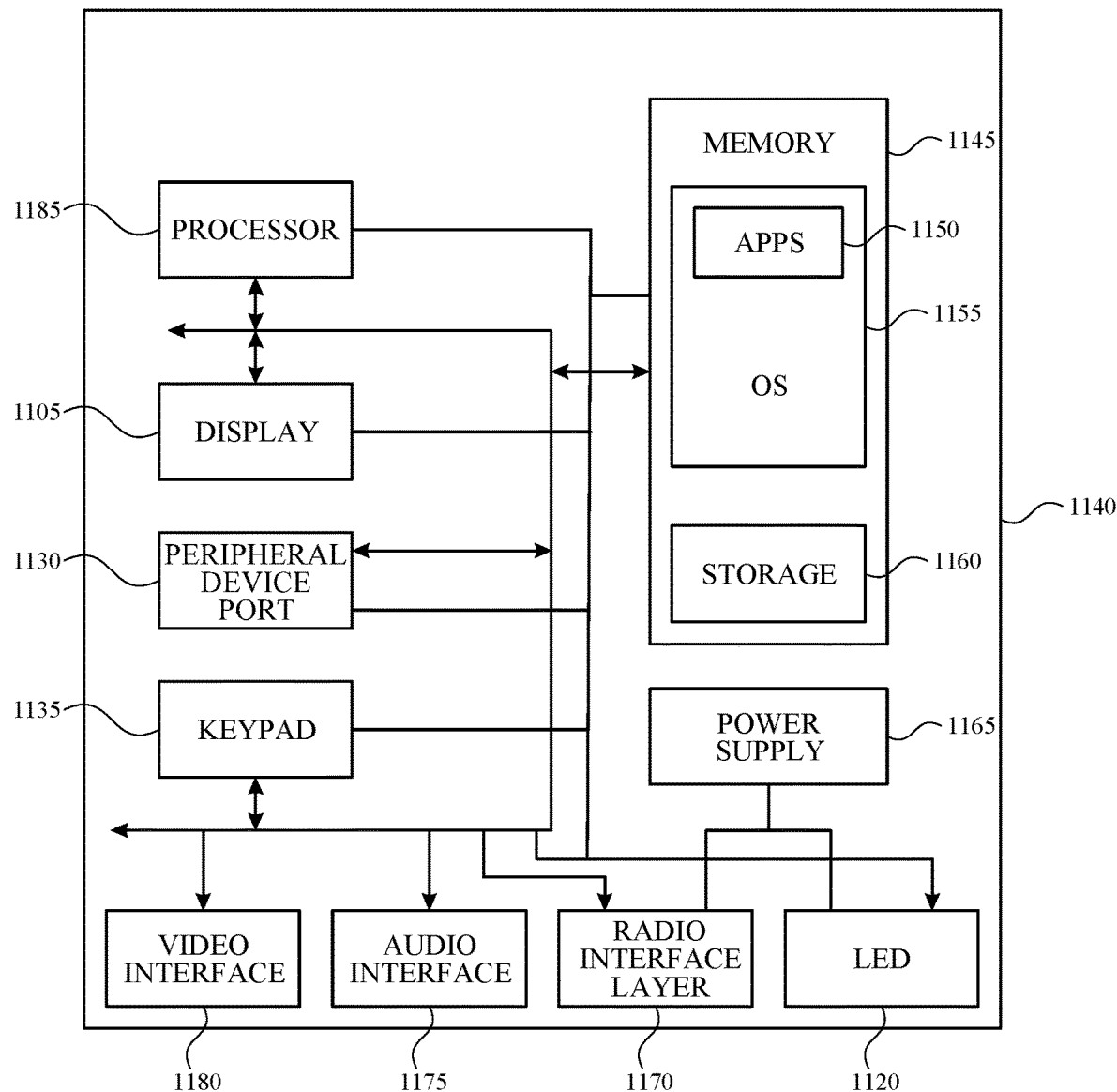

FIGS. 11A and 11B illustrate a mobile electronic device 1100, for example, a mobile telephone, a smart phone, wearable computer (such as a smart watch), a tablet computer, a laptop computer, and the like, with which embodiments of the disclosure may be practiced. With reference to FIG. 11A, one aspect of a mobile electronic device 1100 for implementing the aspects is illustrated.

In a basic configuration, the mobile electronic device 1100 is a handheld computer having both input elements and output elements. The mobile electronic device 1100 typically includes a display 1105 and one or more input buttons 1110 that allow the user to enter information into the mobile electronic device 1100. The display 1105 of the mobile electronic device 1100 may also function as an input device (e.g., a display that accepts touch and/or force input).

If included, an optional side input element 1115 allows further user input. The side input element 1115 may be a rotary switch, a button, or any other type of manual input element. In alternative aspects, mobile electronic device 1100 may incorporate more or less input elements. For example, the display 1105 may not be a touch screen in some embodiments. In yet another alternative embodiment, the mobile electronic device 1100 is a portable phone system, such as a cellular phone. The mobile electronic device 1100 may also include an optional keypad 1135. Optional keypad 1135 may be a physical keypad or a "soft" keypad generated on the touch screen display.

In various embodiments, the output elements include the display 1105 for showing a graphical user interface (GUI), a visual indicator 1120 (e.g., a light emitting diode), and/or an audio transducer 1125 (e.g., a speaker). In some aspects, the mobile electronic device 1100 incorporates a vibration transducer for providing the user with tactile feedback. In yet another aspect, the mobile electronic device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile electronic device 1100. That is, the mobile electronic device 1100 can incorporate a system (e.g., an architecture) 1140 to implement some aspects. In one embodiment, the system 1140 is implemented as a "smart phone" capable of running one or more applications (e.g., browser, e-mail, calendaring, contact managers, messaging clients, games, media clients/players, content selection and sharing applications and so on). In some aspects, the system 1140 is integrated as an electronic device, such as an integrated personal digital assistant (PDA) and wireless phone.

One or more application programs 1150 may be loaded into the memory 1145 and run on or in association with the operating system 1155. Examples of the application programs include phone dialer programs, e-mail programs, personal information management (PIM) programs, word processing programs, spreadsheet programs, Internet browser programs, messaging programs, and so forth.

The system 1140 also includes a non-volatile storage area 1160 within the memory 1145. The non-volatile storage area 1160 may be used to store persistent information that should not be lost if the system 1140 is powered down.

The application programs 1150 may use and store information in the non-volatile storage area 1160, such as email or other messages used by an email application, and the like. A synchronization application (not shown) also resides on the system 1140 and is programmed to interact with a corresponding synchronization application resident on a host computer to keep the information stored in the non-volatile storage area 1160 synchronized with corresponding information stored at the host computer.

The system 1140 has a power supply 1165, which may be implemented as one or more batteries. The power supply 1165 may further include an external power source, such as an AC adapter or a powered docking cradle that supplements or recharges the batteries.

The system 1140 may also include a radio interface layer 1170 that performs the function of transmitting and receiving radio frequency communications. The radio interface layer 1170 facilitates wireless connectivity between the system 1140 and the "outside world," via a communications carrier or service provider. Transmissions to and from the radio interface layer 1170 are conducted under control of the operating system 1155. In other words, communications received by the radio interface layer 1170 may be disseminated to the application programs 1150 via the operating system 1155, and vice versa.

The visual indicator 1120 may be used to provide visual notifications, and/or an audio interface 1175 may be used for producing audible notifications via an audio transducer (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1165 so that when activated, they remain on for a duration dictated by the notification mechanism even though the processor 1185 and other components might shut down for conserving battery power. The LED may be programmed to remain on indefinitely until the user takes action to indicate the powered-on status of the device.

The audio interface 1175 is used to provide audible signals to and receive audible signals from the user (e.g., voice input such as described above). For example, in addition to being coupled to the audio transducer 1125, the audio interface 1175 may also be coupled to a microphone to receive audible input, such as to facilitate a telephone conversation. In accordance with embodiments of the present disclosure, the microphone may also serve as an audio sensor to facilitate control of notifications, as will be described below.

The system 1140 may further include a video interface 1180 that enables an operation of peripheral device 1130 (e.g., on-board camera) to record still images, video stream, and the like. The captured images may be provided to the artificial intelligence entity advertisement system such as described above.

A mobile electronic device 1100 implementing the system 1140 may have additional features or functionality. For example, the mobile electronic device 1100 may also include additional data storage devices (removable and/or non-removable) such as, magnetic disks, optical disks, or tape. Such additional storage is illustrated in FIG. 11B by the non-volatile storage area 1160.

Data/information generated or captured by the mobile electronic device 1100 and stored via the system 1140 may be stored locally on the mobile electronic device 1100, as described above, or the data may be stored on any number of storage media that may be accessed by the device via the radio interface layer 1170 or via a wired connection between the mobile electronic device 1100 and a separate electronic device associated with the mobile electronic device 1100, for example, a server computer in a distributed computing network, such as the Internet. As should be appreciated such data/information may be accessed via the mobile electronic device 1100 via the radio interface layer 1170 or via a distributed computing network. Similarly, such data/information may be readily transferred between electronic devices for storage and use according to well-known data/information transfer and storage means, including electronic mail and collaborative data/information sharing systems.

As should be appreciated, FIGS. 11A and 11B are described for purposes of illustrating the present methods and systems and is not intended to limit the disclosure to a particular sequence of steps or a particular combination of hardware or software components.

Figure 12:
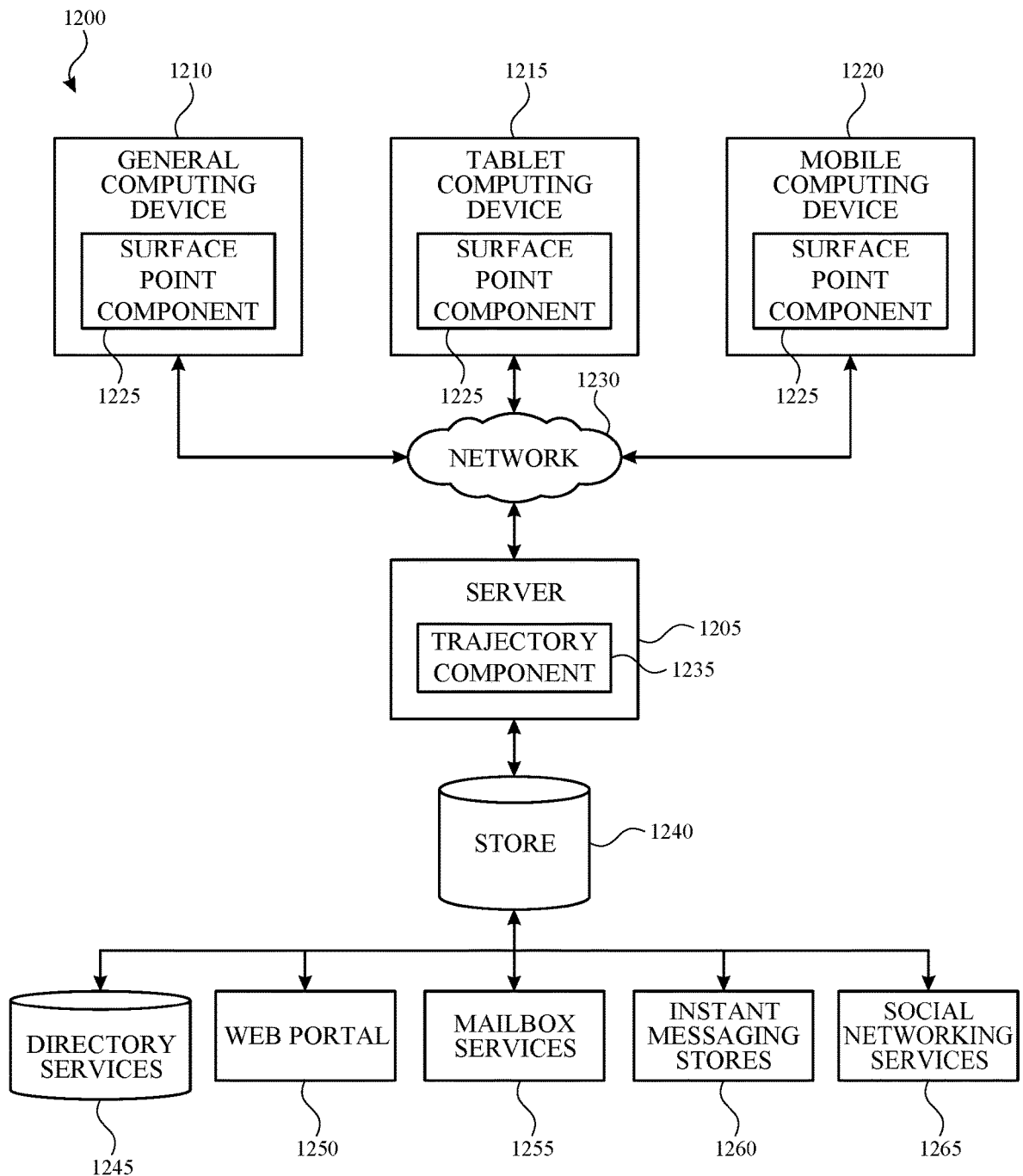
FIG. 12 is a simplified block diagram of a distributed computing system in which aspects of the present disclosure may be practiced.

FIG. 12 illustrates one aspect of the architecture of a system 1200 in which aspects of the disclosure may be practiced. The system may include a general electronic device 1210 (e.g., personal computer), tablet electronic device 1215, or mobile electronic device 1220, as described above. Each of these devices may include a surface point component 1225 and/or a camera position graph generation component such as described. The surface point component may be configured to generate one or more surface points as described herein. Surface points (and, in some examples, a camera position graph) may be transmitted to the trajectory component 1235 which may provide, over the network 1230, an optimal trajectory based on the provided information.

In some aspects, the trajectory component 1235 may receive various types of information or content that is stored by the store 1240 or transmitted from a directory service 1245, a web portal 1250, mailbox services 1255, instant messaging stores 1260, or social networking services 1265.

By way of example, the aspects described above may be embodied in a general electronic device 1210 (e.g., personal computer), a tablet electronic device 1215 and/or a mobile electronic device 1220 (e.g., a smart phone). Any of these embodiments of the electronic devices may obtain content from or provide data to the store 1240.

As should be appreciated, FIG. 12 is described for purposes of illustrating the present methods and systems and is not intended to limit the disclosure to a particular sequence of steps or a particular combination of hardware or software components.

Figure 13:
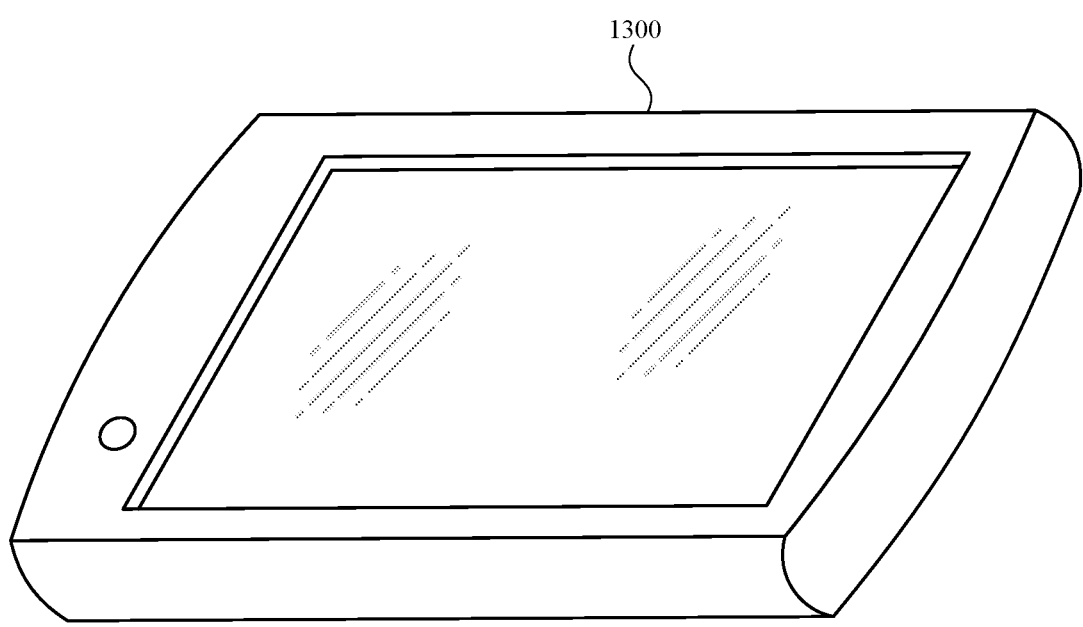
FIG. 13 illustrates a tablet computing device for executing one or more aspects of the present disclosure.

FIG. 13 illustrates an example tablet electronic device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices.

For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, FIG. 13 is described for purposes of illustrating the present methods and systems and is not intended to limit the disclosure to a particular sequence of steps or a particular combination of hardware or software components.

As will be understood from the foregoing disclosure, one aspect of the technology relates to a system comprising: at least one processor; and a memory storing instructions which, when executed by the at least one processor, performs a method for recreating a three-dimensional scene using data captured from a moveable camera. The method comprises: receiving data captured by the moveable camera relating to the three-dimensional scene; generating a reconstruction of the three-dimensional scene based on the received data; identifying one or more surface points within the three-dimensional scene; generating a graph of a plurality of camera positions, comprising one or more nodes and one or more edges; determining, based on the graph, a subgradient of the one or more nodes; generating, based on the subgradient and the graph, an optimal trajectory for the moveable camera; and providing the optimal trajectory to the moveable camera. In an example, the data relating to the three-dimensional scene is received as a result of the moveable camera performing an initial pass of the three-dimensional scene. In another example, identifying one or more surface points within the three-dimensional scene comprises randomly generating one or more surface points based on the reconstruction. In a further example, generating the graph is based on at least one of the reconstruction and the one or more surface points. In yet another example, determining the subgradient comprises: identifying, from the plurality of camera positions, a camera position having a first highest marginal reward; computing, based on the identified camera position, a new marginal reward for each of the plurality of camera positions; and identifying, based on a new marginal reward, a camera position having a second highest marginal reward from the plurality of camera positions. In a further still example, generating the optimal trajectory comprises evaluating a cost associated with at least one of the one or more edges and a reward associated with at least one of the one or more nodes. In another example, the instructions further comprise receiving additional data captured by the moveable camera relating to the three-dimensional scene, wherein the additional data is received as a result of the moveable camera performing a subsequent pass of the three-dimensional scene based on the optimal trajectory.

In another aspect, the technology relates to a computer-implemented method for generating an optimal trajectory for a moveable camera configured to scan a scene. The method comprises: receiving data captured by the moveable camera relating to the scene; generating a reconstruction of the scene based on the received data; identifying one or more surface points within the reconstruction; generating a graph of a plurality of camera positions, comprising one or more nodes and one or more edges; selecting, from the plurality of camera positions, a first camera position having a highest marginal reward; adding the first camera position to the optimal trajectory; determining, based on the optimal trajectory, if a constraint is met; when the constraint is not met, computing, based on the optimal trajectory, a new marginal reward for each of the plurality of camera positions; selecting, based on a new marginal reward, a second camera position having a second highest marginal reward; adding the second camera position to the optimal trajectory; and when the constraint is met, providing the optimal trajectory to the moveable camera. In an example, the data relating to the scene is received as a result of the moveable camera performing an initial pass of the scene. In another example, identifying one or more surface points within the scene comprises randomly generating one or more surface points based on the reconstruction. In a further example, generating the graph is based on at least one of the reconstruction and the one or more surface points. In yet another example, constraint relates to one of the amount of energy required by the moveable camera to navigate the trajectory, the amount of storage capacity required by the trajectory, and the amount of camera positions included by the trajectory. In a further still example, the method further comprises receiving additional data captured by the moveable camera relating to the scene, wherein the additional data is received as a result of the moveable camera performing a subsequent pass of the scene based on the optimal trajectory.

In another aspect, the technology relates to a computer-implemented method for recreating a three-dimensional scene using data captured from a moveable camera. The method comprises: receiving data captured by the moveable camera relating to the three-dimensional scene; generating a reconstruction of the three-dimensional scene based on the received data; identifying one or more surface points within the three-dimensional scene; generating a graph of a plurality of camera positions, comprising one or more nodes and one or more edges; determining, based on the graph, a subgradient of the one or more nodes; generating, based on the subgradient and the graph, an optimal trajectory for the moveable camera; and providing the optimal trajectory to the moveable camera. In an example, the data relating to the three-dimensional scene is received as a result of the moveable camera performing an initial pass of the three-dimensional scene. In another example, identifying one or more surface points within the three-dimensional scene comprises randomly generating one or more surface points based on the reconstruction. In a further example, generating the graph is based on at least one of the reconstruction and the one or more surface points. In yet another example, determining the subgradient comprises: identifying, from the plurality of camera positions, a camera position having a first highest marginal reward; computing, based on the identified camera position, a new marginal reward for each of the plurality of camera positions; and identifying, based on a new marginal reward, a camera position having a second highest marginal reward from the plurality of camera positions. In a further still example, generating the optimal trajectory comprises evaluating a cost associated with at least one of the one or more edges and a reward associated with at least one of the one or more nodes. In another example, the method further comprises receiving additional data captured by the moveable camera relating to the three-dimensional scene, wherein the additional data is received as a result of the moveable camera performing a subsequent pass of the three-dimensional scene based on the optimal trajectory.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory storing instructions which, when executed by the at least one processor, performs a method for recreating a three-dimensional scene using data captured from a moveable camera, comprising:
      receiving data captured by the moveable camera relating to the three-dimensional scene;
      generating a reconstruction of the three-dimensional scene based on the received data;

identifying one or more surface points within the reconstruction of the three-dimensional scene;

generating a graph of a plurality of potential camera positions, the graph comprising one or more edges that connect potential camera positions of the graph;

determining a subgradient for a potential camera position of the graph based at least in part on a solid angle associated with a surface point within the reconstruction, the solid angle representing observable data of the surface point from the potential camera position;

generating, based on the subgradient and the graph, a trajectory for the moveable camera; and providing the trajectory to the moveable camera.

2. The system of claim 1, wherein the data relating to the three-dimensional scene is received as a result of the moveable camera performing an initial pass of the three-dimensional scene.

3. The system of claim 1, wherein identifying one or more surface points within the reconstruction of the three-dimensional scene comprises randomly generating one or more surface points based on the reconstruction.

4. The system of claim 1, wherein generating the graph is based on at least one of the reconstruction and the one or more surface points.

5. The system of claim 1, wherein determining the subgradient comprises:

generating a set of coverage metrics comprising a coverage metric for each potential camera position of the plurality of potential camera positions;

identifying, from the plurality of camera positions, the potential camera position based on determining it has a highest coverage metric of the set of coverage metrics;

computing, based on the potential camera position, an updated set of coverage metrics comprising a new coverage metric for each potential camera position of a set of remaining potential camera positions, wherein the set of remaining potential camera positions does not include the identified potential camera position; and identifying, based on a new highest coverage metric from the updated set of coverage metrics, another potential camera position having another highest marginal reward from the updated set of coverage metrics.

6. The system of claim 1, wherein generating the trajectory comprises evaluating a cost associated with at least one of the one or more edges and a coverage metric associated with the potential camera position.

7. The system of claim 1, further comprising instructions for:

receiving additional data captured by the moveable camera relating to the three-dimensional scene, wherein the additional data is received as a result of the moveable camera performing a subsequent pass of the three-dimensional scene based on the trajectory.

8. A computer-implemented method for generating an optimal trajectory for a moveable camera configured to scan a scene, comprising:

receiving data captured by the moveable camera relating to the scene;

generating a reconstruction of the scene based on the received data;

identifying one or more surface points within the reconstruction;

generating a graph of a plurality of potential camera positions, the graph comprising one or more edges that connect potential camera positions of the graph;

generating a set of coverage metrics, the set comprising a coverage metric for each potential camera position of the graph;

selecting, from the plurality of camera positions, a first camera position having a highest coverage metric;

adding the first camera position to the trajectory;

determining, based on the trajectory, if a constraint is met;

when the constraint is not met, updating the set of coverage metrics, based on the trajectory, for each potential camera position of a set of remaining potential camera positions, wherein the set of remaining potential camera positions does not include the first camera position;

selecting, based on a new highest coverage metric in the updated set of coverage metrics, a second potential camera position;

adding the second camera position to the trajectory; and when the constraint is met, providing the trajectory to the moveable camera.

9. The computer-implemented method of claim 8, wherein the data relating to the scene is received as a result of the moveable camera performing an initial pass of the scene.

10. The computer-implemented method of claim 8, wherein identifying one or more surface points within the reconstruction of the scene comprises randomly generating one or more surface points based on the reconstruction.

11. The computer-implemented method of claim 8, wherein generating the graph is based on at least one of the reconstruction and the one or more surface points.

12. The computer-implemented method of claim 8, wherein the constraint relates to one of the amount of energy required by the moveable camera to navigate the trajectory, the amount of storage capacity required by the trajectory, and the amount of camera positions included by the trajectory.

13. The computer-implemented method of claim 8, further comprising:

receiving additional data captured by the moveable camera relating to the scene, wherein the additional data is received as a result of the moveable camera performing a subsequent pass of the scene based on the trajectory.

14. A computer-implemented method for recreating a three-dimensional scene using data captured from a moveable camera, comprising:

receiving data captured by the moveable camera relating to the three-dimensional scene;

generating a reconstruction of the three-dimensional scene based on the received data;

identifying one or more surface points within the reconstruction of the three-dimensional scene;

generating a graph of a plurality of potential camera positions, the graph comprising one or more edges that connect potential camera positions of the graph;

determining a subgradient for a potential camera position of the graph based at least in part on a solid angle associated with a surface point within the reconstruction, the solid angle representing observable data of the surface point from the potential camera position;

generating, based on the subgradient and the graph, a trajectory for the moveable camera; and providing the trajectory to the moveable camera.

15. The computer-implemented method of claim 14, wherein the data relating to the three-dimensional scene is received as a result of the moveable camera performing an initial pass of the three-dimensional scene.

16. The computer-implemented method of claim 14, wherein identifying one or more surface points within the reconstruction of the three-dimensional scene comprises randomly generating one or more surface points based on the reconstruction.

17. The computer-implemented method of claim 14, wherein generating the graph is based on at least one of the reconstruction and the one or more surface points.

18. The computer-implemented method of claim 14, wherein determining the subgradient comprises:
generating a set of coverage metrics comprising a coverage metric for each potential camera position of the plurality of potential camera positions;
identifying, from the plurality of camera positions, the potential camera position based on determining it has a highest coverage metric of the set of coverage metrics;
computing, based on the potential camera position, an updated set of coverage metrics comprising a new coverage metric for each potential camera position of a set of remaining potential camera positions, wherein the set of remaining potential camera positions does not include the identified potential camera position; and
identifying, based on a new highest coverage metric from the updated set of coverage metrics, another potential camera position having another highest marginal reward from the updated set of coverage metrics.

19. The computer-implemented method of claim 14, wherein generating the trajectory comprises evaluating a cost associated with at least one of the one or more edges and a coverage metric associated with the potential camera position.

20. The computer-implemented method of claim 14, further comprising:
receiving additional data captured by the moveable camera relating to the three-dimensional scene, wherein the additional data is received as a result of the moveable camera performing a subsequent pass of the three-dimensional scene based on the trajectory.

* * * * *